UNITED STATES PATENT OFFICE.

HENRI ALBERT ALEXANDRE LUSSIGNY, OF PARIS, FRANCE.

METHOD OF CARROTTING FURS.

SPECIFICATION forming part of Letters Patent No. 501,798, dated July 18, 1893.

Application filed March 18, 1893. Serial No. 466,679. (No specimens.) Patented in France October 17, 1892, No. 224,980; in Belgium October 21, 1892, No. 101,805, and in Italy November 12, 1892, No. 32,908.

*To all whom it may concern:*

Be it known that I, HENRI ALBERT ALEXANDRE LUSSIGNY, a citizen of the Republic of France, residing in Paris, in the Republic of France, have invented a certain new and useful Improvement in the Method of Carrotting Furs Intended for the Manufacture of Felts Without Using Mercury, (for which I have obtained a French patent, No. 224,980, dated October 17, 1892; a Belgian patent, No. 101,805, dated October 21, 1892, and an Italian patent, for fifteen years, No. 32,908, dated November 12, 1892,) of which the following is a specification.

My invention relates to carrotting or preparing furs, intended for the manufacture of felts, without using mercury.

In carrotting or preparing furs intended for the manufacture of felts as ordinarily conducted, nitrate of mercury is applied to the furs being operated upon and according as the strength of the liquor containing the nitrate of mercury is in a less or greater degree of concentration the carrotting produced is pale or yellow. The use of nitrate of mercury is very objectionable in consequence of its fatal effects on the health of the workmen who have to work upon the furs. In order to obtain a yellow carrotting without using mercury I employ simultaneously carbon and nitric acid or the liquid product of the reaction of these two bodies on one another, and I employ these bodies or the liquid product of their mutual reaction in any relative proportions, either alone or mixed with any other bodies as I may deem expedient.

In one manner of carrying out my invention I introduce ten parts of carbon preferably wood charcoal into one hundred parts of nitric acid warmed to a temperature of from 60° to 80° centigrade. When the product of the reaction of the nitric acid and carbon is to be employed it is diluted with water so as to be made of a density which may, according to the degree of the carrotting required, correspond to 8° or 10° of Baumé's hydrometer or a specific gravity of about from 1.06 to 1.07, the specific gravity of water being taken as unity. The manufacture of the liquid used according to this part of my invention is attended with danger.

The operations involved in carrotting or preparing furs for use in the manufacture of felts by means of the materials provided according to my invention are similar to those performed when nitrate of mercury is employed in carrotting furs.

The felt to be operated upon is placed on the carrotter's bench and the operator applies the carrotting liquid by means of a brush so that the liquid may be caused to penetrate as far as the skin or to the extent which may be necessary or desirable, and the subsequent drying of the pelt is effected in a stove and at a temperature similar to that employed in carrotting by means of nitrate of mercury. The other operations to which the fur is subjected remain the same as in the process hitherto employed.

Having fully described my invention, what I claim, and desire to secure by Letters Patent, is—

The herein described improvement in the process of carrotting or preparing furs for use in the manufacture of felts, which consists in treating the furs with carbon and nitric acid or the liquid product of the reaction of these bodies upon one another.

In testimony whereof I have signed my name to this specification in the presence of two subscribing witnesses.

HENRI ALBERT ALEXANDRE LUSSIGNY.

Witnesses:
CHARLES DONY,
ROBT. M. HOOPER.